United States Patent [19]

Abell

[11] Patent Number: 4,588,073
[45] Date of Patent: May 13, 1986

[54] PADDED CHAIN LIVE ROLLER CONVEYOR

[75] Inventor: Donald E. Abell, Chesterfield, Mo.

[73] Assignee: Alvey Inc., St. Louis, Mo.

[21] Appl. No.: 654,141

[22] Filed: Sep. 26, 1984

[51] Int. Cl.$^4$ .............................................. B65G 13/06
[52] U.S. Cl. .................................... 198/781; 198/783; 198/790
[58] Field of Search .............. 198/781, 783, 787, 790, 198/831, 833

[56] References Cited

U.S. PATENT DOCUMENTS

| | | | |
|---|---|---|---|
| 3,158,252 | 11/1964 | Vogt | 198/783 |
| 3,189,161 | 6/1965 | Schneider et al. | 198/787 |
| 3,306,430 | 2/1967 | Fogg | 198/127 |
| 3,643,788 | 2/1972 | Werntz | 198/781 |
| 3,768,630 | 10/1973 | Inwood et al. | 198/781 |
| 4,074,805 | 2/1978 | Bodewes | 198/790 |
| 4,273,239 | 6/1981 | Thwaites et al. | 198/781 |
| 4,441,607 | 4/1984 | Bowman et al. | 198/790 |
| 4,453,627 | 6/1984 | Wilkins | 198/781 |
| 4,458,809 | 7/1984 | White et al. | 198/790 |

FOREIGN PATENT DOCUMENTS 2418177 10/1979 France .................. 198/781

*Primary Examiner*—Joseph E. Valenza
*Assistant Examiner*—Michael Stone
*Attorney, Agent, or Firm*—Gravely, Lieder & Woodruff

[57] ABSTRACT

An article conveyor having live rollers forming an article conveying run and in which a continuous padded drive chain is operably mounted to have flexibility in a direction substantially parallel to the conveying run, and in which a first direction of article conveyance is provided with controllable pressure fluid lifters for zoning the first direction of conveyance to control the drive of articles approaching a standing article. In addition, controls are provided to render the conveyor reversible as to travel of articles.

9 Claims, 10 Drawing Figures

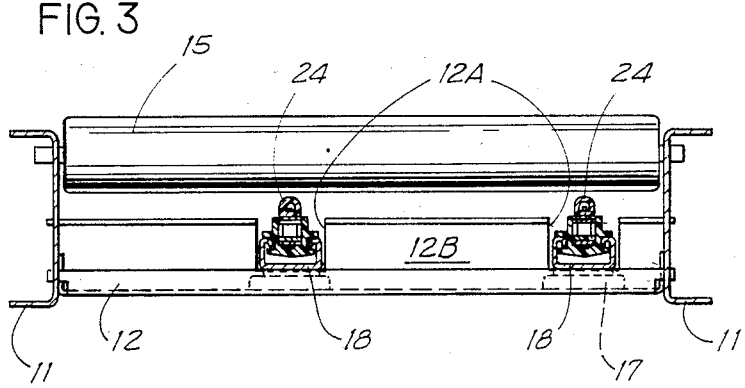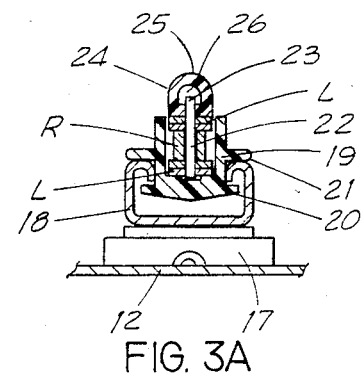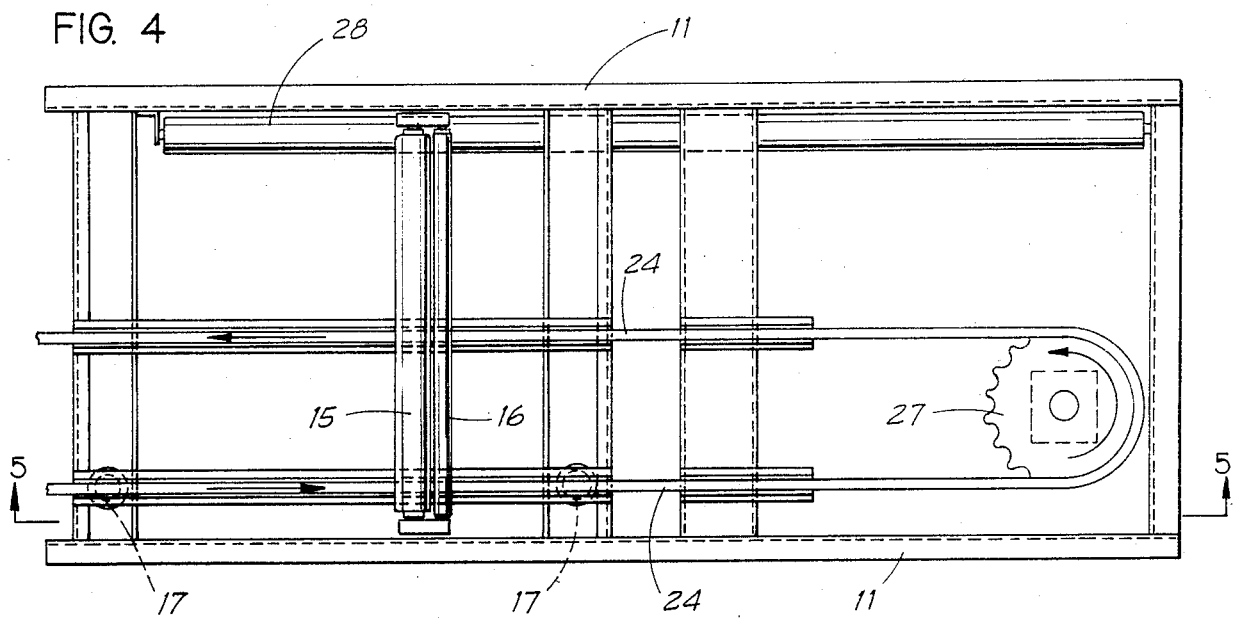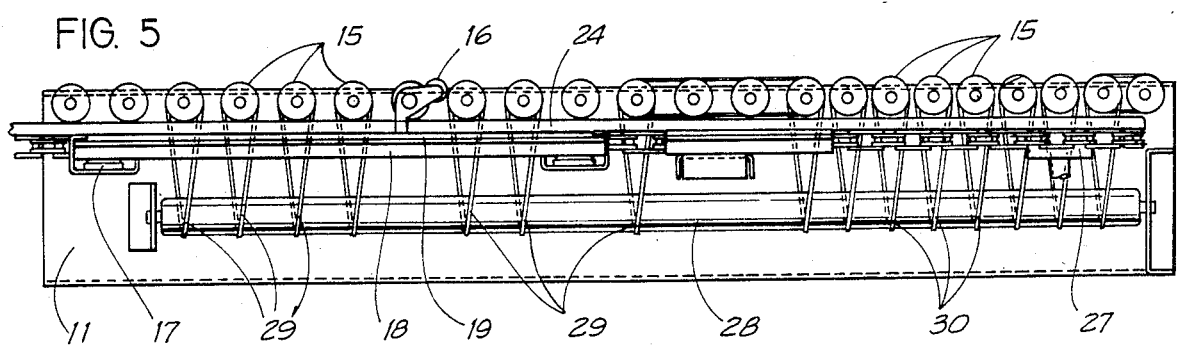

PADDED CHAIN LIVE ROLLER CONVEYOR

BACKGROUND OF THE INVENTION

1. Field of the Invention

The present invention relates to powered live roller conveyors having a unique assembly of padding on the drive chains and mounting of the drive chain.

2. Description of the Prior Art

The arrangements for transporting articles on a roller conveyor have been concerned with the drive of the article supporting rollers. Examples of such arrangements are seen in Bodewes U.S. Pat. No. 4,074,805 of Feb. 21, 1978, Fogg U.S. Pat. No. 3,306,430 of Feb. 28, 1967, Werntz U.S. Pat. No. 4,117,923 of Oct. 3, 1978, Turnbough U.S. Pat. No. 4,319,675 of Mar. 16, 1982, Turnbough et al U.S. Pat. No. 4,392,568 of July 12, 1983 and White et al U.S. Pat. No. 4,458,809 of July 10, 1984.

In these examples of the prior art, the orientation of the drive chain has followed conventional practice, that is, the rollers have horizontal axes and the chain links lie in vertical planes. The result is that the sprockets driving the chains have the teeth engage the chain rollers which raises the problem of how to use the chains to support padding so it does not interfere with sprocket teeth penetration between rollers. In the examples where the article supporting rollers are driven by direct-contact with rope or other friction means, the support of such means to obtain uniform contact with a span of rollers has presented problems.

There are other problems presented by the foregoing prior art examples. In the rope drive the support of the rope is very important, and obtaining uniform contact is difficult when long stretches of conveyor runs are required. Then again, the stretch that occurs over time adds to the problem of maintaining contact. In the examples where roller chains are used to support friction pads or strips, the problems surround the contact between the chain and the pads so that the teeth of the chain drive sprockets do not interfere with the manner of attaching the pads. The foregoing are some of the problems which become evident upon inspection of the prior art disclosures.

BRIEF DESCRIPTION OF THE INVENTION

The embodiment presently preferred to exemplify the invention comprises a roller chain supported in a guide of low friction characteristic and oriented so the usual chain links are in horizontal planes while the rollers have their axes vertical for the unique purpose of providing elongated roller axles. The elongated axles project upwardly from the guide and serve to engage a high friction pad which may be continuous for average conveyor runs, or may be applied in suitable lengths for long conveyor runs. The friction pad is capable of flexing around curves in following the drive chain path.

The embodiment also comprises a system of article traffic control in a padded chain conveyor so that pressure is avoided by sequencing articles by sectionalizing a conveyor run by elevating and lowering specified lengths of the padded chain relative to the article supporting rollers.

BRIEF DESCRIPTION OF THE DRAWINGS

FIG. 3 is an enlarged transverse sectional view seen at line 3—3 in FIG. 1;

FIG. 3A is an enlarged sectional detail of the mounting of the pad on the roller chain which is typical of the embodiment;

FIG. 4 is a fragmentary plan view of the conveyor showing the chain drive sprocket and the drive of the rollers in the area of the sprocket;

FIG. 5 is a fragmentary view of the roller drive in the zone of the chain sprocket as seen along line 5—5 in FIG. 4;

DETAIL DESCRIPTION OF THE EMBODIMENT

Figure 1:
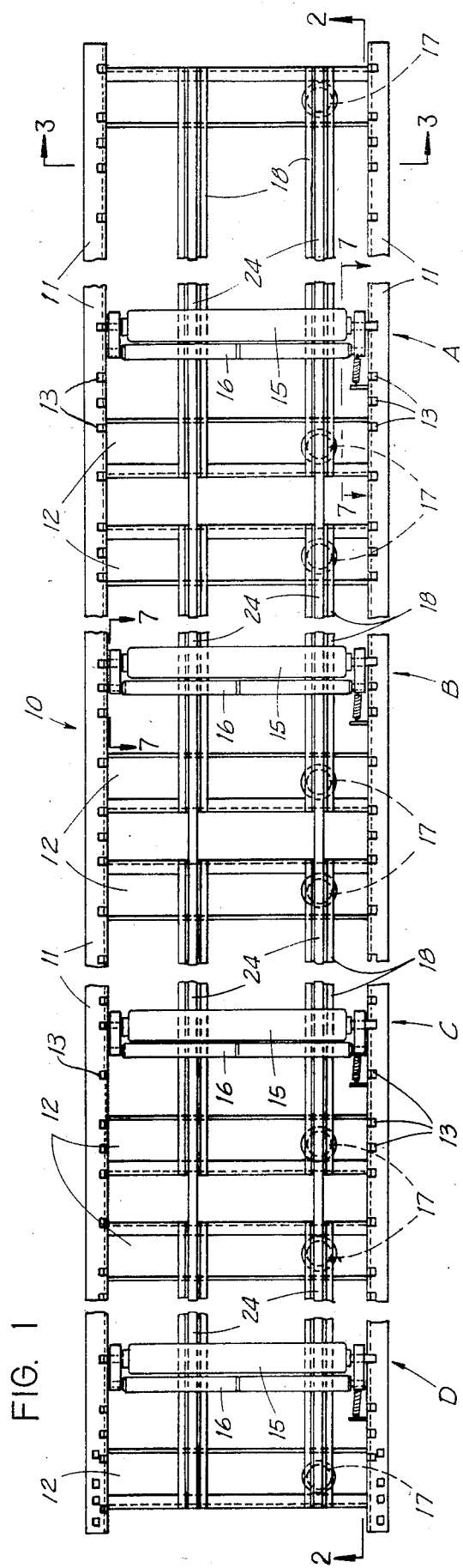
FIG. 1 is a plan view of a typical section of an article conveyor equipped with the components included in this invention. The article supporting rollers being omitted for clarity.
Figure 2:
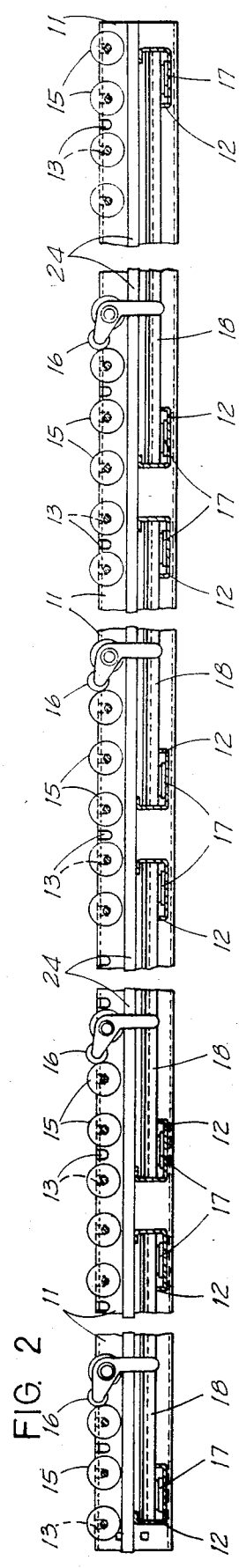
FIG. 2 is a longitudinal sectional elevation of the conveyor seen in FIG. 1 with a side wall removed to better show the characteristics of the conveyor, the view being taken along line 2—2 in FIG. 1.

Referring to FIGS. 1 and 2, the general construction of the conveyor 10 includes spaced channel shaped side rails 11 held in spaced parallel positions by a plurality of channels 12 secured to the vertical webs of side rails 11 with the top and bottom flanges turned outwardly. The channels 12 are positioned either by tabs thereon inserted through slots in the side rails or by suitable clips and bolts, as is well understood. The view of FIG. 1 is typical of conveyor sections that can be connected in end-to-end alignment to make up a complete conveyor system.

The side rails 11 are formed with slots 13 to receive the shaft ends of the article supporting rollers 15. At spaced intervals along the conveyor, sensor rolls 16 are pivotally mounted on the shaft of an adjacent roller 15. A full complement of article supporting live or free turning rollers has not been shown in FIGS. 1 and 2 so the components below these rollers can be seen and understood better. Channels 12 are distributed along the length of and span the distance between side rails 11, the shape of each being selected so it can serve a dual purpose. One purpose is to hold the side rails 11 in spaced parallel positions, and the second purpose is to afford a suitable place to locate a pneumatic expander or lifter device 17 which has a diaphragm type bellows presented face upwardly. Reference is made to U.S. Pat. No. 4,441,607 to Bowman et al, issued Apr. 10, 1984 for a disclosure of a bellows type pneumatic device which is incorporated herein by reference.

It can be seen (FIGS. 1 and 2) that bellows type lifter devices 17 are arranged in pairs, with a device 17 adjacent each end of an elongated U-shaped channel guide 18 (see FIG. 3). Each guide 18 is held in the desired position (FIG. 3) by being passed through slots 12A in the vertical wall 12B of the channel 12. The slots 12A do not prevent vertical movement of the guides 18. Each guide 18 carries an equally elongated low-friction track 19 which has flanges 20 and 21 projecting laterally from each side to embrace the flanges of the side walls of the guide. The track 19 (see FIG. 3A) supports a pad carrying roller chain in the position in which the chain links L are oriented in horizontal planes while the rollers R are turned so the axles 22 are in the vertical plane. Each axle 22 is elongated so as to have an upper end 23 exposed to a suitable extent to be inserted into apertures in the base of an elongated high-friction pad 24 (FIG. 3A). The pad 24 is an extruded shape having a friction drive surface 25 and an interior void or hollow area 26 which is continuous. The hollow area 26 allows the surface 25 to flex when it is raised to engage the under side of the article supporting rollers 15. In the view of FIG. 3, only the right hand roller chain and pad 24 is to be lifted under the influence of the pairs of lifter devices 17. The left hand roller chain is the returning pass and does not move vertically so the pad 24 remains free of contact with the rollers throughout its length. In the view of FIGS. 1 and 2 the pad 24 is seen to be continuous in the return pass and also in the drive pass so as to extend over each pair of lifter devices 17 and bridge the gaps between channel guides 18.

As the pad 24 reaches the end of the conveyor (FIGS. 4 and 5) a motor driven chain sprocket 27 is set with its axle vertical so the sprocket teeth are turning in a horizontal plane. The sprocket 27 carries the chain around a turn and causes the pad 24 to flex in a horizontal arc in which the base of the pad remains on the upper chain links L. A unique feature of this arrangement is that the pad 24 does not interfere with the engagement of the sprocket teeth between the rollers R. Furthermore, the pad 24 can be provided with apertures for each roller axle extension 23 to thereby maintain a better control over the pad flexure as it traverses the sprocket circle. This causes the pad 24 to bend or flex side ways of its longitudinal axis so that the friction drive surface 25 is not constantly subjected to stretching as it passes around the sprocket. The pad 24 traverses the sprocket in the direction indicated by the arrow.

It has been found that in the sprocket zone the article supporting rollers 15 need to be driven positively to move articles, as the pad 24 looses effective contact during the change of direction around the curve dictated by the sprocket 27. Positive drive means is seen in FIG. 5 where a shaft 28 is operatively mounted on the inside of a side rail 11. The shaft is engaged by a plurality of elastic-type belts 29 which are engaged with the article supporting rollers 15 which, in turn, are positively driven by the pad 24. The number of belts 29 selected for driving the shaft 29 from the rollers 15 can vary, and in the example there are 7 such belts. The rotation of shaft 28 is picked up by a second group of elastic-type belts 30 which transfer the drive from shaft 28 into the last series of article supporting rollers 15. In the view of FIG. 4 the travel of the pad 24 in its roller contacting pass is to the left, and the return pass is opposite. It is apparent from FIG. 3 that the chain and pad supports 18 are located in about the same horizontal plane so the pad 24 is normally free of contact with the rollers 15. This simplifies construction and assembly.

Figure 6:
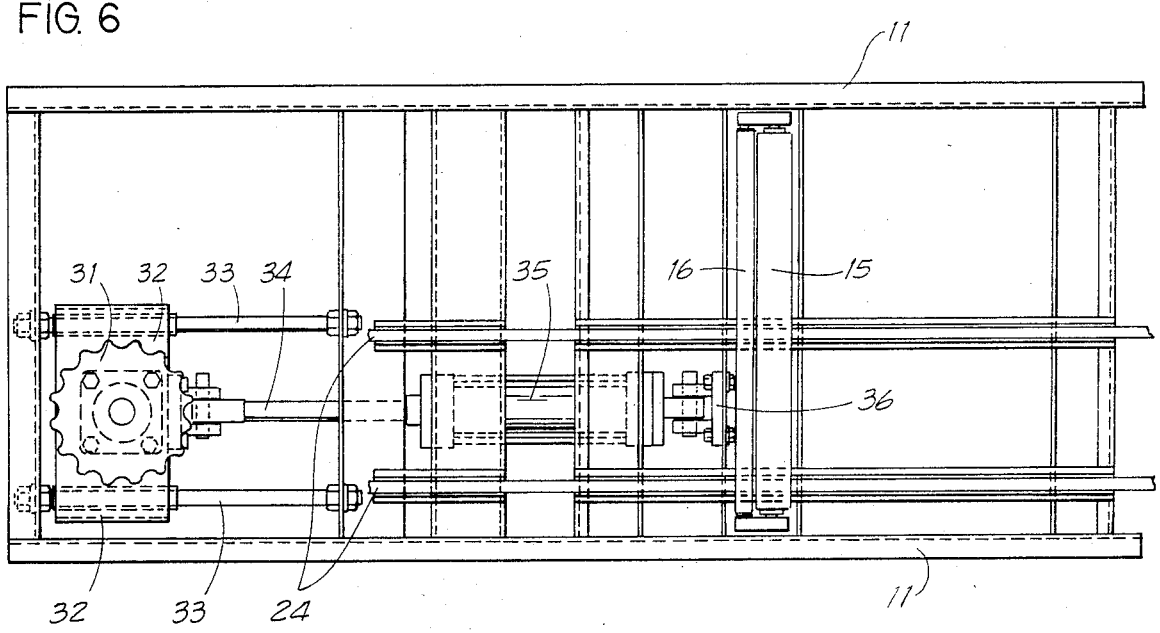
FIG. 6 is a plan view similar to FIG. 4 but showing the idler sprocket and chain tension adjusting means at a non-driving end of the conveyor.

FIG. 6 is a view of the idler sprocket end of the conveyor. The padded chain returns in guide 18 and engages an idler sprocket 31 which is supported on a carriage 32 slidably mounted on a pair of rods 33. The sprocket is connected by a rod 34 to a cylinder 35 anchored by one end on a fixed bracket 36. A pneumatic supply is connected (not shown) to the cylinder to effect positioning of the sprocket 31 for adjusting the desired tension or slack in the chain. While not shown this end of the conveyor is also supplied with a shaft 28 which is connected by elastic belts 29 to the article propelling rollers 15 in the same manner as shown in FIG. 5. At this end of the conveyor the articles are being discharged and need to be positively propelled beyond the end of the conveyor by the belt driven rollers 15.

Thus far described, the conveyor 10 can be used for article transportation by simply maintaining the lifters 17 under pressure to retain the padded chain in driving contact with the roller 15. A suitable pressure fluid system can be employed and need not be shown. Should the conveyor 10 be used as an article accumulator, a control system will be needed and reference will be directed to such a system.

Figure 7:
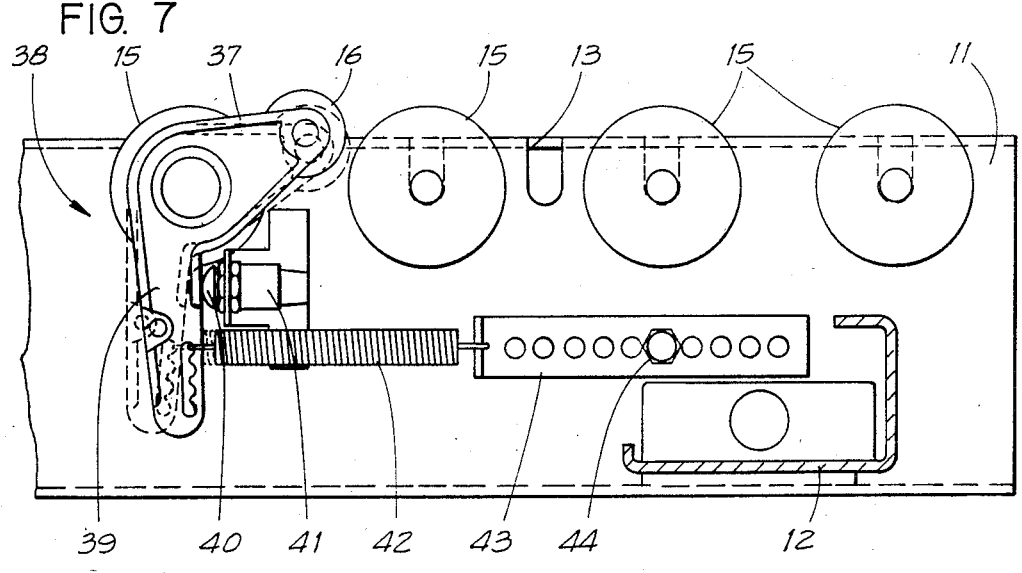
FIG. 7 is a fragmentary detail of a typical sensor roller and control switch for the conveyor, the detail being seen at line 7—7 in FIG. 1.
Figures 8, 9:
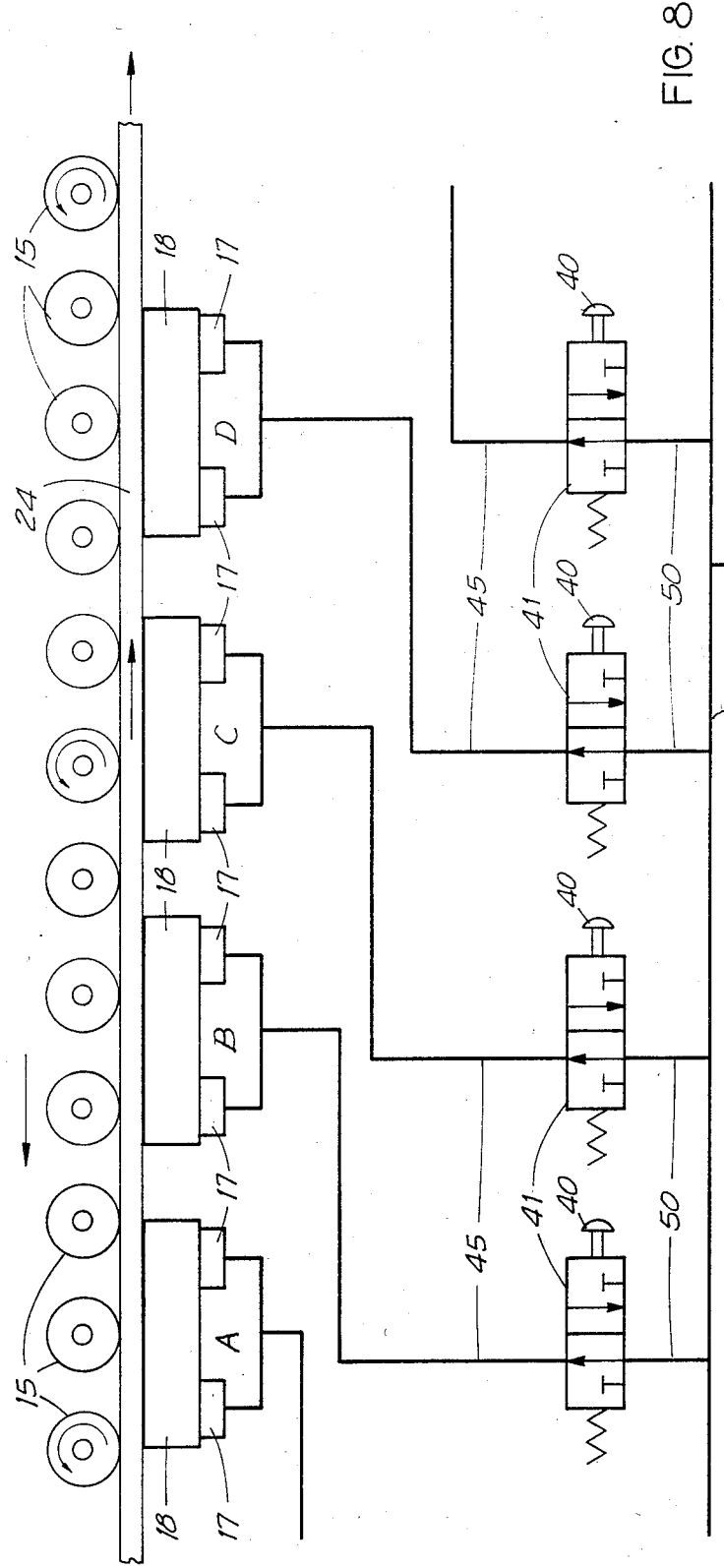
FIG. 8 is a schematic view of a pressure fluid circuit associated with the conveyor of this invention.
FIG. 9 discloses modified short section pads for the roller chain.

An article control system for the above conveyor is seen in FIGS. 7 and 8. Control signal input is obtained from a series of sensor rollers 16, and a typical installation of a sensor roller 16 is shown in FIG. 7. The sensor roller 16 is carried on arm 37 of a crank 38 and the opposite arm 39 is at an angle so it passes adjacent the tappet 40 of a fluid pressure control valve 41. The arm 39 is adjustably engaged by a spring 42 and the spring is anchored in a bracket 43 which has a series of apertures by which it can be adjustably connected to an anchor pin 44. The spring normally draws the arm 39 in to depress the valve tappet 40 and at the same time it elevates the sensor roller 16 above the top surface of the rollers 15 so that an article can depress the roller 16 sufficiently to effect release of valve tappet 40 which is moved to the dotted outline position. The assembly shown in FIG. 7 is repeated at the location of each sensor roller 16 seen in FIGS. 1 and 2.

The application of the fluid pressure control valve is seen in FIG. 8 in a schematic layout having four conveyor zones A, B, C and D denoted by pairs of lifter devices 17, each with its overlying track guide 18 for the roller chain carried friction pad 24. Each zone is provided with a control valve 41 associated with a sensor roller 16. These valves 41 are shown in FIG. 8 in a normal pressure fluid supply position where the respective conduits 45 are open through the valve 41 to a fluid pressure source 46 to allow the lifter means 17 to raise the chain track guide 18 and pad 24 into contact with the rollers 15. In this setting the rollers 15 are driven. In operative condition the sensor rollers 16 are spring loaded, as by spring 42 in FIG. 7, the source of pressure fluid 46 is connected through a filter 47 and pressure relief safety valve 48 to supply conduit 49, and by branch lines 50 to the respective valves 41. All the valves 41 are normally shifted to positions such that the pressure fluid is supplied to the respective lifter devices 17. The lifter devices expand and press the overlying guide 18 for the chain and pad 24 into driving contact with the rolls 15. Now the conveyor is able to move articles over the rollers 15 as the roller chain is driven by its sprocket 27. Should an article meet with an obstruction and remain on a sensor roll 16, such as sensor roll in zone A of FIG. 8 to hold it down, the associated control valve 41 will be actuated to move its spool in the direction to connect the lifter devices 17 in zone B to dump the air to atmosphere to cease the drive of rollers in that zone. The result is the article coasts to a stop or gently nudges the stopped article. If the second article is stopped the next trailing valve 41 will be moved to release the air from its associated lifter 17 to remove drive power to the rollers in that zone C. This sequence of events will create a control progression where when an article is stopped in any zone of the conveyor the drive from the pad 24 in the next trailing zone will be dropped away from the article supporting rollers 15.

The foregoing disclosure has set forth an article conveyor in which a roller chain turned on its side carries a high friction surface urethane pad as the source of the drive on the article supporting roller 15. This is simple, inexpensive and does away with the use of belts and attendant problems of belt tracking and lacing pullout problems. The padded chain combination is well adapted for conveyor combinations of straight and curves with the same drive. Moreover, such conveyors have a low maintenance requirement where chain stretch is automatically accommodated by the urethane pad stretching to the same amount. The pad is easily installed or removed from the series of roller axle extensions 23 which do not require special attachments. The pad simply slips on or off the pin extensions 23, and in normal use the pad is pressed down so it cannot work loose and therefore requires no fastening means. The pad may be made up in any desired length as it is formed as an integral extrusion and requires the formation of simple holes on a center-to-center spacing equal to the roller axle spacing.

While a preferred embodiment of the invention has been disclosed, it should be understood that modifications may come to mind from this disclosure which are substantial equivalents and are to be included within the principles of the invention. For example, the pad 24 may be a series of short sections 24A rather than one continuous length, wherein each short section will have an engagement on at least two extending ends 23 in the roller chain (FIG. 9). The engagement of at least a pair of ends 23 is necessary to maintain the pad sections in proper alignment. The simplest way to interconnect the pad 24, or its sections 24A, to the axle extensions 23 is by the formation of holes. The advantage of this attachment is that the pad 24 or 24A is able to adjust itself on the extensions 23 by simple rotation which does not deform the pad or place an undue side load on the chain.

What is claimed is:

1. In an article conveyor having live rollers supporting the articles, the improvement of means for rotating the live rollers comprising:
   (a) a roller chain made up of rollers mounted on axles and interconnected by links engaged at said axles of the rollers, said roller axles being oriented generally vertical and said links lying in generally horizontal planes such that the roller chain has flexibility in the horizontal plane and is able to traverse curves in such plane;
   (b) a high friction pad means having a friction surface for presentation to the live rollers, and said pad having a base presented to said links at one side of said rollers and formed with a series of holes aligned on the axis of said pad and penetrating said base; and
   (c) means for attaching said pad to said roller chains, said attaching means being extensions on said roller axles adapted to be received in said holes in said pad base.

2. The article conveyor improvement set forth in claim 1 wherein said pad and said roller chain are laterally flexible and follow a path in the article conveyor confined substantially to a plane parallel with the article supporting live rollers.

3. The article conveyor improvement set forth in claim 1 wherein said elongated pad is formed of material which possesses a linear elongation stretch factor which is at least equal to the roller chain linear elongation stretch factor.

4. The article conveyor improvement set forth in claim 1 wherein said roller chain traverses an elongated closed path in a generally horizontal path, sprockets define the opposite ends of the closed path, and roller chain guide track means holds the roller chain in positions to traverse said closed path, said guide track means defining a roller chain driving pass and a return pass between said sprockets for said roller chain.

5. The article conveyor improvement set forth in claim 4 wherein said elongated pad is carried by and is substantially co-extensive with said roller chain, and said pad is a hollow member formed with a friction surface which can flex on presentation to said live rollers.

6. The article conveyor improvement set forth in claim 4 wherein said guide track means forms a plurality of zones of roller chain guidance, and lift means is operatively associated with each of said guide track means for lifting said pad into roller driving engagement.

7. The article conveyor improvement set forth in claim 1 wherein guide means is located in spaced parallel positions in said conveyor for guiding said roller chain in opposite directions beneath the live rollers, a plurality of roller chain lifter means arranged in spaced positions along said guide means in one of said parallel pathes, a source of pressure fluid, means connecting said pressure fluid source to each of said lifter means in said one of said parallel pathes, and control means operable for directing the pressure fluid to said lifter means selectively for determining the continuity of article travel along the conveyor.

8. The article conveyor improvement set forth in claim 1 wherein said pad means is a continuous body having a length equal to the length of said roller chain.

9. The article conveyor improvement set forth in claim 1 wherein said pad means is a series of bodies arranged in adjacent positions to present a series of friction surfaces to the live rollers, each of said bodies having at least a pair of holes engaged on said extensions of a pair of roller axles.

* * * * *